(12) United States Patent
Lee

(10) Patent No.: US 8,606,284 B2
(45) Date of Patent: Dec. 10, 2013

(54) TERMINAL HAVING TRANSFER MODE AND NETWORK CONNECTION METHOD

(75) Inventor: In Youl Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 90 days.

(21) Appl. No.: 13/195,563

(22) Filed: Aug. 1, 2011

(65) Prior Publication Data

US 2012/0052829 A1 Mar. 1, 2012

(30) Foreign Application Priority Data

Aug. 30, 2010 (KR) ........................ 10-2010-0084319

(51) Int. Cl.
- H04W 72/00 (2009.01)
- H04W 4/00 (2009.01)
- H04W 72/04 (2009.01)
- H04W 48/16 (2009.01)

(52) U.S. Cl.
CPC .............. H04W 72/04 (2013.01); H04W 48/16 (2013.01)
USPC ........ 455/450; 455/452.2; 455/453; 455/434; 455/435.1; 455/456.3

(58) Field of Classification Search
USPC ........ 455/414.1, 411, 421, 432.3, 434, 435.1, 455/452.1, 452.2, 453, 456.1–456.6
See application file for complete search history.

(56) References Cited

U.S. PATENT DOCUMENTS

| | | | | |
|---|---|---|---|---|
| 5,912,918 A | * | 6/1999 | Bauchot et al. | 375/133 |
| 5,995,823 A | * | 11/1999 | Stephens | 455/410 |
| 6,011,973 A | * | 1/2000 | Valentine et al. | 455/456.6 |
| 6,132,306 A | * | 10/2000 | Trompower | 455/11.1 |
| 6,317,600 B1 | * | 11/2001 | Salonaho et al. | 455/453 |
| 6,321,306 B1 | | 11/2001 | Arimilli et al. | |
| 6,324,399 B1 | * | 11/2001 | Salmivalli | 455/433 |
| 6,389,288 B1 | * | 5/2002 | Kuwahara et al. | 455/456.6 |
| 6,496,703 B1 | * | 12/2002 | da Silva | 455/456.4 |
| 6,882,850 B2 | * | 4/2005 | McConnell et al. | 455/453 |
| 7,076,255 B2 | * | 7/2006 | Parupudi et al. | 455/456.1 |
| 7,206,593 B1 | * | 4/2007 | Yarkosky et al. | 455/517 |
| 7,403,773 B2 | * | 7/2008 | Kappes et al. | 455/432.1 |
| 7,561,540 B2 | * | 7/2009 | Dougherty et al. | 370/310.2 |
| 7,836,181 B2 | * | 11/2010 | Bejerano et al. | 709/226 |
| 8,254,346 B2 | * | 8/2012 | Karaoguz et al. | 370/338 |
| 8,290,532 B1 | * | 10/2012 | Goyal et al. | 455/522 |
| 2004/0203748 A1 | | 10/2004 | Kappes et al. | |
| 2005/0068169 A1 | * | 3/2005 | Copley et al. | 340/539.13 |
| 2007/0155395 A1 | * | 7/2007 | Gopalakrishnan et al. | 455/453 |

(Continued)

FOREIGN PATENT DOCUMENTS

| | | |
|---|---|---|
| EP | 1 811 801 | 7/2007 |
| EP | 2 107 840 | 10/2009 |

OTHER PUBLICATIONS

Extended European Search Report dated Nov. 3, 2011 in corresponding European Patent Application No. 11177039.2.

*Primary Examiner* — Duc M Nguyen
(74) *Attorney, Agent, or Firm* — H.C. Park & Associates, PLC (57) ABSTRACT

A terminal and a network connection method to automatically connect devices to a network and transfer data to the devices using the received signal strength indication (RSSI) levels of signals respectively received from the devices. The terminal may transfer different data to devices based on the RSSI level of the signals received from the devices and/or the locations of the devices.

29 Claims, 11 Drawing Sheets

(56) References Cited

U.S. PATENT DOCUMENTS

| | | |
|---|---|---|
| 2007/0178922 A1 | 8/2007 | Yamada et al. |
| 2009/0034493 A1 | 2/2009 | Malik |
| 2009/0058638 A1 | 3/2009 | Kanagala et al. |
| 2009/0253461 A1 | 10/2009 | Kuwahara |
| 2010/0056181 A1 * | 3/2010 | Rippon et al. ............ 455/456.3 |

* cited by examiner

TERMINAL HAVING TRANSFER MODE AND NETWORK CONNECTION METHOD

CROSS-REFERENCE TO RELATED APPLICATION

This application claims priority from and the benefit under 35 U.S.C. §119(a) of Korean Patent Application No. 10-2010-0084319, filed on Aug. 30, 2010, which is incorporated by reference for all purposes as if fully set forth herein.

BACKGROUND

1. Field

Exemplary embodiments disclosed herein relate to terminal and network connection methods that can automatically connect devices to a network.

2. Discussion of the Background

Wireless networking technologies and infrastructures have rapidly developed. Desired data can be obtained using mobile terminals, such as smart phones, notebook computers, and personal digital assistant (PDAs).

Wireless networking technologies include wireless local area network (hereafter "wireless LAN"), Bluetooth®, and the like. Wi-Fi® is a type of wireless LAN that has been widely used. In order to communicate with a network server using Wi-Fi®, a device must connect to an access point (AP) terminal of the network that has an AP mode function.

The AP terminal establishes a service set identifier (SSID) and a security level, and sets data to be shared and provided to the devices, thereby establishing an accessible network. In order to connect with the network server, each of the devices searches the AP terminal, and is connected to the network by inputting a password based on the SSID or security level. Then, each of the devices accesses the data shared and provided by the AP terminal.

However, in the network connection method, each of the devices may require many preliminary operations, such as an operation of inputting an SSID, a password, and the like, so as to access the data, and therefore, the accessibility of a user to data is considerably degraded. Particularly, when a user accesses data with commonality in public places, such as public institutions, such a complicated procedure may be required, and therefore, may be inefficient.

SUMMARY

Exemplary embodiments provide a network terminal device and a network connection method that can automatically connect devices to a network using the received signal strength indication (RSSI) levels of signals respectively received from the devices.

Additional features of the invention will be set forth in the description which follows, and in part will be apparent from the description, or may be learned by practice of the invention.

An exemplary embodiment provides a terminal, including: an antenna unit to transmit signals to and to receive signals from devices; a received signal strength indication (RSSI) detecting unit to detect RSSI level information from the signals received by the antenna unit, the RSSI level information indicating an RSSI level; and a control unit to determine candidate devices from the devices based on the RSSI level detected by the RSSI detecting unit, wherein the control unit connects the determined candidate devices to a network.

An exemplary embodiment provides a network connection method of a terminal, the method including: searching for devices; detecting an RSSI level information of the searched devices, the RSSI level information indicating an RSSI level; determining candidate devices to receive data using the RSSI level; and connecting the determined candidate devices to a network.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the present disclosure.

DETAILED DESCRIPTION OF THE ILLUSTRATED EMBODIMENTS

Exemplary embodiments will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. Moreover, it is to be understood that the features of the various embodiments described herein are not mutually exclusive and can exist in various combinations and permutations, even if such combinations or permutations are not expressly made herein, without departing from the spirit and scope of the invention. In the drawings, the size and relative sizes of layers and regions may be exaggerated for clarity. Like reference numerals in the drawings denote like elements.

The terminology used herein is for the purpose of describing particular embodiments only and is not intended to be limiting of this disclosure. As used herein, the singular forms "a," "an," and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
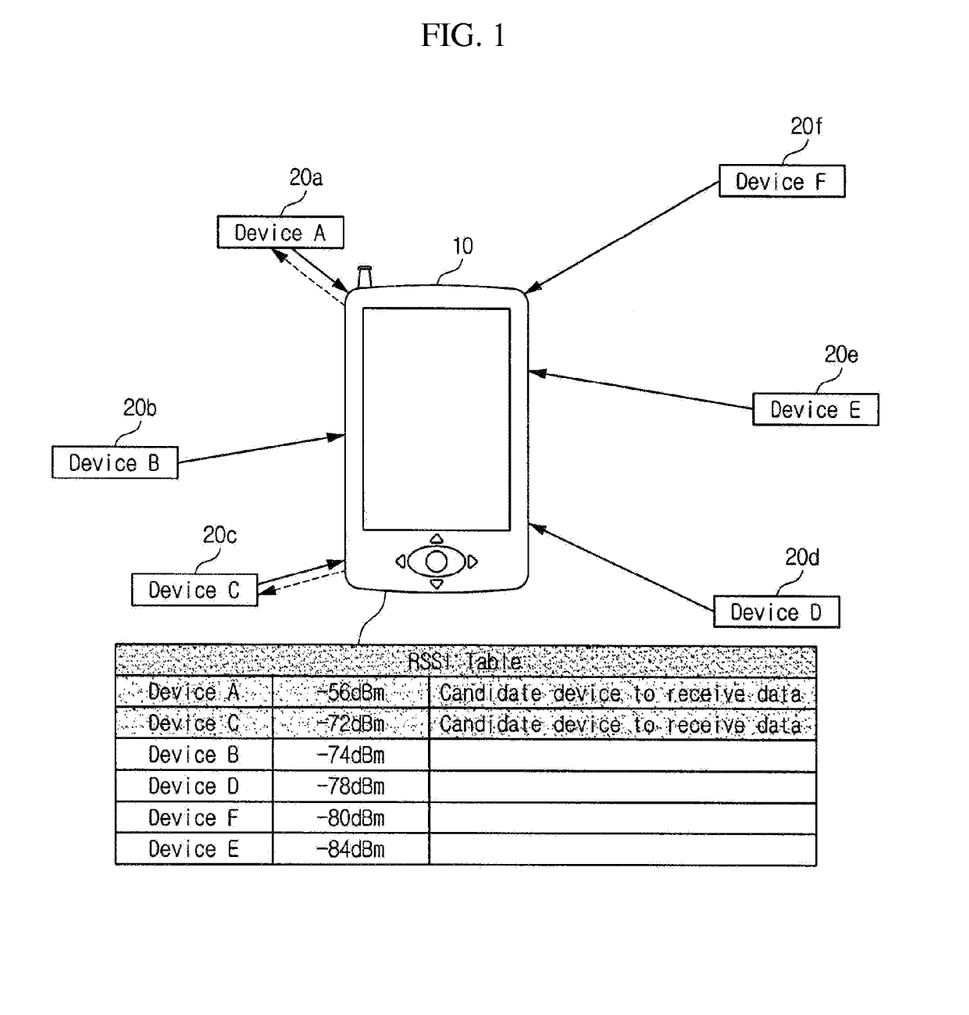
FIG. 1 is a view illustrating a network system according to an exemplary embodiment.

FIG. 1 is a view illustrating a network system according to an exemplary embodiment.

As shown in FIG. 1, the terminal 10 supports an access point (AP) and devices 20a to 20f connected to a network by the terminal 10 so as to receive desired data transferred from the network.

The terminal 10 may transfer data to and/or receive data from each of the devices 20a to 20f. The terminal 10 may be a wireless AP terminal or a mobile terminal, such as a smart phone, notebook computer, PDA or the like. In an exemplary embodiment, the terminal 10 may be connected to a wired or wireless Intranet or Internet network to transfer data to each of the wireless devices 20a to 20f, and the mobile terminal supports the AP mode.

Each of the devices 20a to 20f may be connected to a wireless network formed by the terminal 10. Each device 20a to 20f has an antenna unit for receiving wireless signals from terminal 10 and receives data transferred from the terminal 10. The devices 20a to 20f may be mobile terminals, such as smart phones, notebook computers, PDAs, desktop computers, or the like.

The wireless network may be a Wi-fi® network or any one of a Bluetooth®, Zigbee®, infrared data association (IrDA) ®, Wi-Max®, or wireless broadband ("Wibro") network. An appropriate communication method may be employed among these wireless networks, considering the capacity and transfer distance of data to be provided to devices, and the like.

In FIG. 1, the terminal 10 determines whether to transfer data to each of the devices 20a to 20f by using the received signal strength indication ("RSSI") level of a signal, such as a radio signal, received from each of the devices 20a to 20f. For example, the RSSI level of a device 20a is increased as the distance between the terminal 10 and the device 20a is decreased. And if the distance between the terminal 10 and the device 20a is increased, the RSSI level of the radio signal from the device 20a decreases.

In FIG. 1, the terminal 10 connects devices 20a and 20c to the network using the RSSI levels of the devices 20a and 20f, detected by the terminal 10, and transfers data to the upper two devices 20a and 20c. The terminal 10 in an exemplary embodiment connects and transfers data to each of the devices 20a and 20c to the network based on RSSI level without an additional authentication procedure, and transfers data to each of the devices.

Figure 2:
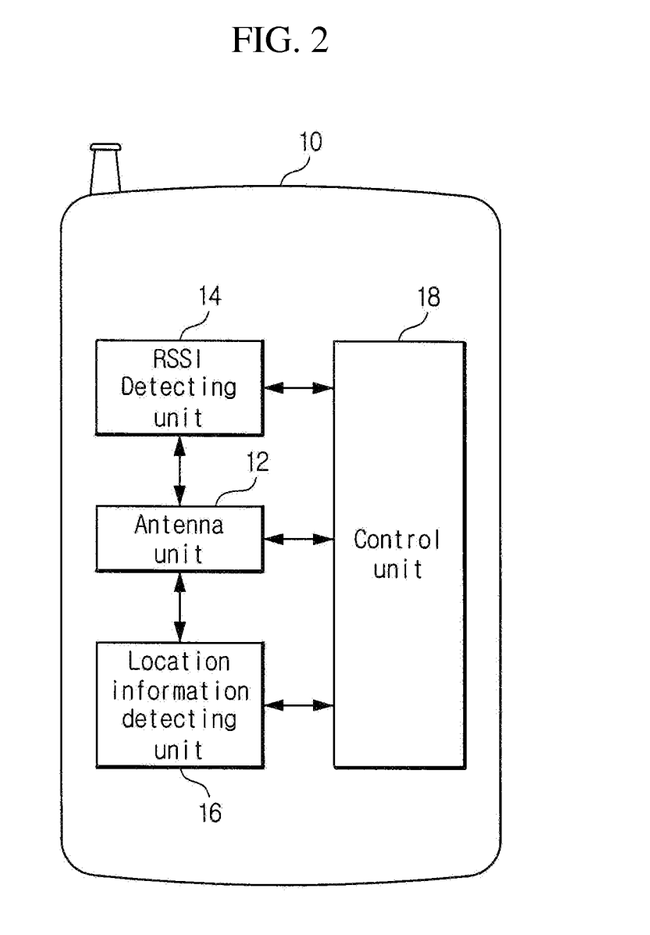
FIG. 2 is a schematic view of the terminal of FIG. 1 according to an exemplary embodiment.

FIG. 2 is a schematic view of the terminal of FIG. 1 according to an exemplary embodiment.

Referring to FIG. 2, the terminal 10 includes an antenna unit 12, an RSSI detecting unit 14, a location information detecting unit 16 and a control unit 18.

The antenna unit 12 receives wireless radio signals from devices attempting to connect to the network formed by the terminal 10. The antenna unit 12 receives and transmits data from devices connected to the network of the terminal 10.

The RSSI detecting unit 14 detects the RSSI levels of the radio signals received by the antenna unit 12. In an exemplary embodiment, dBm is used as a unit of the RSSI level. The size of the RSSI level is in inverse proportion to the absolute value of the value of the RSSI level. Thus, an RSSI level of −60 dBm is higher than an RSSI level of −80 dBm. A device having an RSSI level of −60 dBm is located closer to the terminal 10 than a device having an RSSI level of −80 dBm, and therefore, the intensity of the radio signal received from the device having an RSSI level of −60 dBm is greater than that of the radio signal received from the device having an RSSI level of −80 dBm.

The location information detecting unit 16 detects location information of each device from the radio signal received from the antenna unit 12. The location information detecting unit 16 may detect the location of the device using location information of peripheral base stations obtained from the radio signal received from the antenna unit 12, and RSSI information of the radio signal received from the device.

In an exemplary embodiment, the terminal 10 may further include a global positioning system (GPS) sensor module that receives a GPS satellite signal and a GPS location information detecting unit that detects location information of devices based on the GPS satellite signal received by the GPS sensor module. In an exemplary embodiment, the GPS sensor module may be integrally formed with the antenna unit 12, and the GPS location information detecting unit may be integrally formed with the location information detecting unit 16.

In a case in which the GPS sensor module is installed in each of the devices, the GPS location information detecting unit may directly receive the location information of each of the devices, detected from each of the devices. Further, the GPS location information detecting unit may detect the location of each of the devices by combining the location information of the terminal 10, obtained using the GPS satellite signal, with the location information of the base stations and the RSSI information.

The control unit 18 searches for devices surrounding the terminal 10 from the radio signals received by the antenna unit 12, and determines candidate devices, which may be connected to the network and receive data. The control unit 18 also determines which data transfer method to use for each candidate device identified. The control unit 18 receives RSSI level information from the RSSI detecting unit 14 and location information from the location information detecting unit 16 or GPS location information detecting unit (not shown). The control unit 18 controls the data to be transferred to the candidate devices. In exemplary embodiments, the control unit 18 may determine candidate devices or a data transfer method using the RSSI level information, the location information, or the RSSI level information in conjunction with the location information.

In FIG. 1 described above, the control unit 18 builds an RSSI table that includes the received RSSI level information of the devices 20a to 20f. The RSSI level information may include an RSSI level of each device 20*a* to 20*f*. In the exemplary embodiment depicted by FIG. 1, the control unit 18 determines devices 20*a* and 20*c* as having the highest two RSSI levels as candidate devices using the RSSI table. The control unit 18 connects the devices 20*a* and 20*c* to the network and transfers data to the devices 20*a* and 20*c*. Thus, the control unit 18 determines that the N devices having the highest RSSI level in the RSSI table are candidate devices. In an exemplary embodiment, the control unit 18 may determine candidate devices using the values of the RSSI levels or the location information of the devices, which will be described in detail below with reference to FIG. 3 to FIG. 6.

Figure 3:
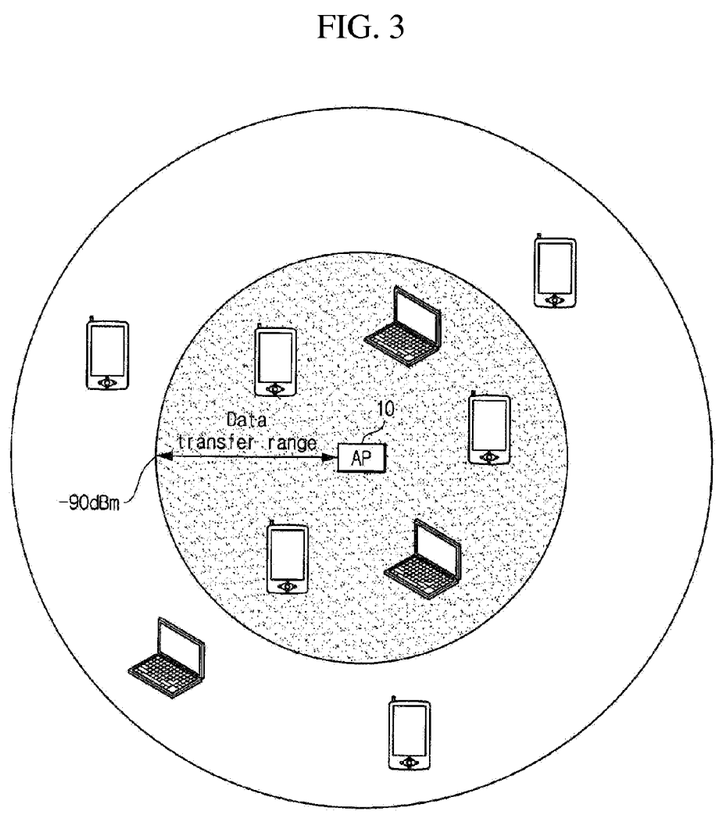
FIG. 3 is a view illustrating a network connection operation according to an exemplary embodiment.

FIG. 3 is a view illustrating a network connection operation according to an exemplary embodiment.

Referring to FIG. 3, the terminal 10 connects and transfers data to devices having an RSSI level more than a critical value. For example, the critical value may be −90 dBm. Thus, if a simple transfer mode is selected, the terminal 10 searches the radio signals received by antenna unit 12 and detects the RSSI levels of the devices to build an RSSI table.

The specified value may be a minimum RSSI level, which the devices exceed, to receive data, i.e., candidate devices are selected from the searched devices. The control unit 18 of the terminal 10 determines if any devices has an RSSI level greater than the critical value using the RSSI table. The control unit 18 of the terminal 10 connects the devices with RSSI level greater than −90 dBm to the network and transfers data to the devices. Thus, the terminal 10 can connect devices to the network and transfer data to the devices.

In FIG. 3, the devices which each have RSSI level greater than the critical value are determined to be candidate devices to receive data. However, the devices that have RSSI levels less than the critical value are not determined to be candidate devices. However, aspects of the present invention are not limited thereto and devices with RSSI level in a range may also be determined as candidate devices. In exemplary embodiments, the critical value may be established before or contemporaneous with the determination of candidate devices.

Figure 4:
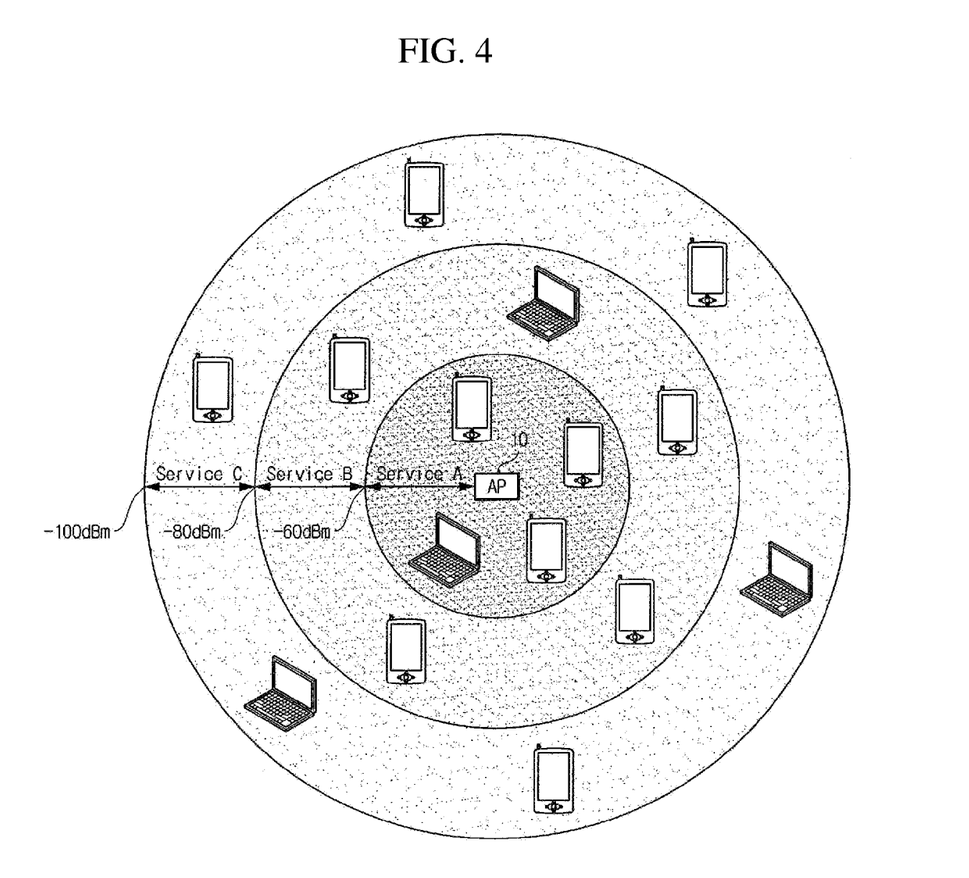
FIG. 4 is a view illustrating a network connection operation according to an exemplary embodiment.

FIG. 4 is a view illustrating a network connection operation according to an exemplary embodiment.

Referring to FIG. 4, the terminal 10 connects and transfers data to devices having an RSSI level greater than a critical value, for example, −100 dBm. The terminal 10 transfers a different kind of data for each RSSI level. That is, only the devices having more than, for example, −100 dBm are determined as candidate devices to receive data, and different kinds of services are provided to the candidate devices by dividing the RSSI levels of the candidate devices based on the RSSI levels of the devices. For example, the RSSI ranges may be divided into three service areas, i.e., Service A between MAX (maximum size) and −60 dBm, Service B between −60 dBm and −80 dBm, and Service C between −80 dBm and −100 dBm. Here, methods of providing different kinds of services to the respective three sections may be as follows. A first method may be providing different amounts of data based on RSSI levels. That is, if the RSSI level of a device is high, the data transfer state of each of the candidate devices is in a satisfactory state. Therefore, a large amount of data may be provided if the RSSI level is high, and a small amount of data is provided if the RSSI level is low. Referring to FIG. 4, a large amount of data may be provided to the section between MAX and −60 dBm, a middle amount of data may be provided in the section between −60 dBm and −80 dBm, and a small amount of data may be provided in the section between −80 dBm and −100 dBm. In other words, a greatest amount of data may be provided to devices in Service A, data delivery in Service B may be greater than that provided in Service C and less than that provided in Service A, and data delivery may be the smallest in Service C.

In an exemplary embodiment, the different amounts of data are not provided based on the RSS levels, rather data stored in different storage areas may be provided based on RSSI level being within ranges. In other words, if multiple folders are formed in multiple drivers or a single driver, or folders within a server, etc., the data respectively stored in the different drivers or the different folders may be provided to candidate devices based on the RSSI ranges. In an exemplary embodiment, different amounts of data may be stored in the respective drivers or folders within the server or data to be provided to the candidate devices are separately stored based on the RSSI ranges of the candidate devices. Further, the different transfer of data according to RSSI level and/or location information may be based on different amounts of data and/or data being stored in different locations.

The sever may be the terminal 10, which can serve as the AP, or may be a separate server or terminal in a wired or wireless Intranet or Internet network to which devices are connected through the terminal 10.

Figure 5:
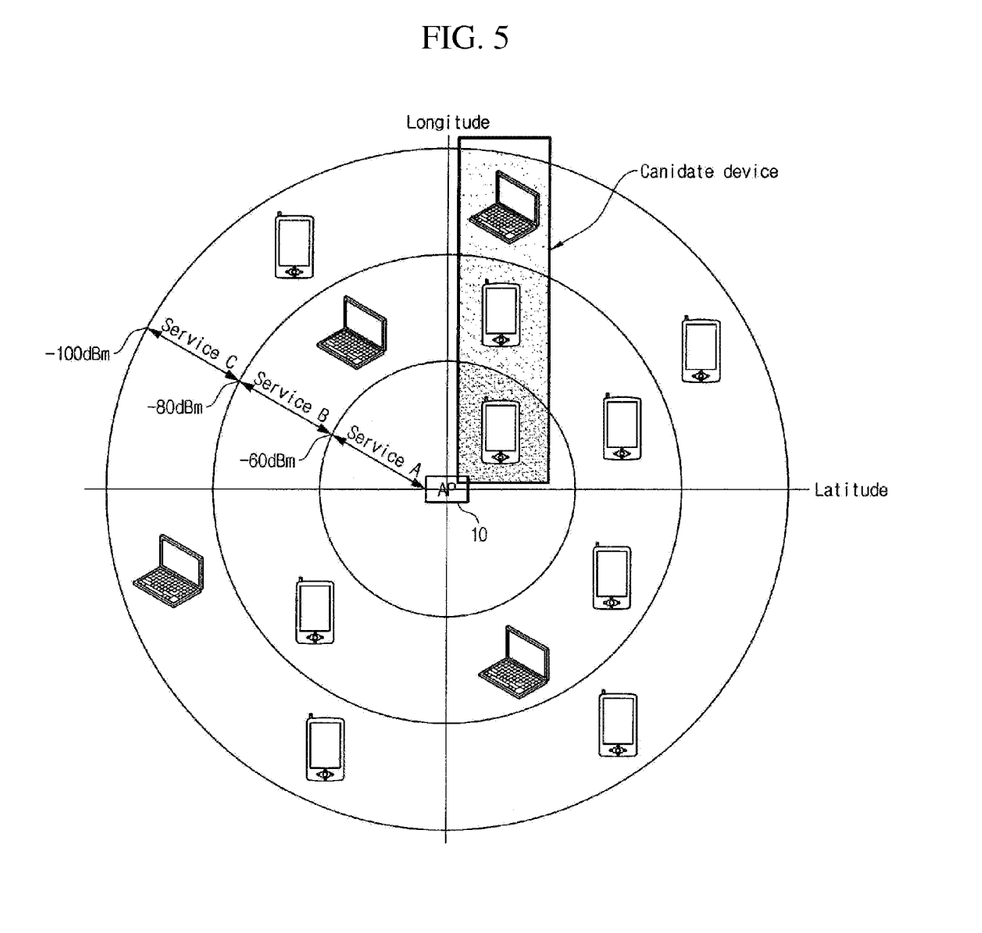
FIG. 5 is a view illustrating a network connection operation according to an exemplary embodiment.

FIG. 5 is a view illustrating a network connection operation according to an exemplary embodiment.

Referring to FIG. 5, the terminal 10 provides different kinds of data to devices based on location and RSSI level information. The terminal 10 determines devices located in a specific area with a minimum RSSI level as candidate devices using the location information and RSSI information of the respective devices. The terminal 10 connects the candidate devices to the network and transfers data to the candidate devices. The transferred data varies based on the location of the device and RSSI level information.

In other words, the terminal 10 determines the candidate devices using the RSSI levels and location information of the devices. The control unit 18 of the terminal 10 receives RSSI level information from an RSSI detecting unit 14, and receives the location information from a location information detecting unit 16 and/or a GPS location information detecting unit (not shown). The critical value of the RSSI level may be −100 dBm, and the specified area may be the box highlighted in FIG. 5. Thus, the terminal 10 determines three devices to receive data using the two pieces of information.

Referring to FIG. 5, the control unit 18 determines devices as candidate devices. Here, the values of the RSSI levels of the devices are more than −100 dBm, and the devices are located in the region of a box indicated by a bold solid line. The terminal 10 may provides services A, B and C corresponding to the respective RSSI ranges to the candidate devices determined by the control unit 18. In FIG. 5, the terminal 10 provides different kinds of services to the determined candidate devices based on the RSSI ranges. Devices with an RSSI level between MAX (maximum size) and −60 dBm receive Service A, between −60 dBm and −80 dBm receive Service B, and between −80 dBm and −100 dBm receive Service C.

Figure 6:
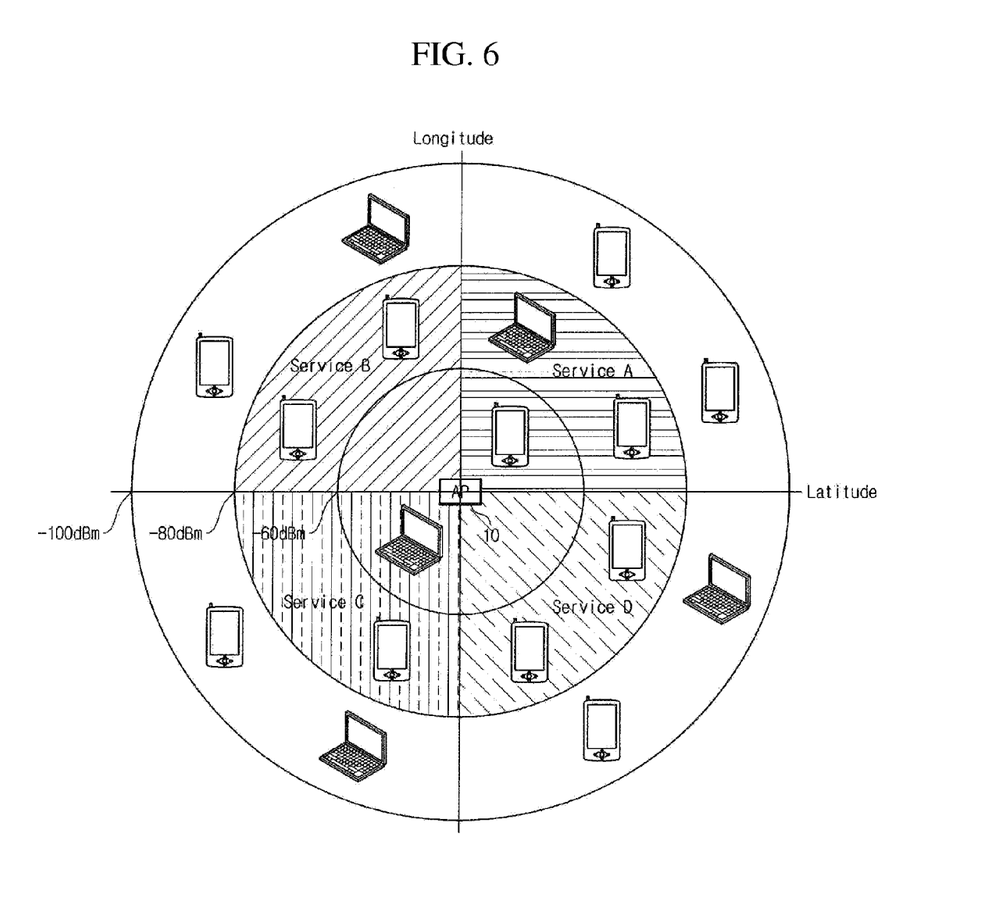
FIG. 6 is a view illustrating a network connection operation according to an exemplary embodiment.

FIG. 6 is a view illustrating a network connection operation according to an exemplary embodiment.

Referring to FIG. 6, the terminal 10 determines candidate devices using the RSSI levels and location information of devices and transfers data to the candidate devices as described above with respect to FIG. 5. In this instance, the terminal 10 provides different kinds of services to the candidate devices for each location area of the candidate devices.

The terminal 10 determines devices which have RSSI levels greater than, for example, a critical value of −80 dBm, as candidate devices to receive data, and provides services A, B, C and D, by dividing the candidate devices into four areas based on latitude and longitude.

The services A, B, C, and D may be different kinds of services. The different kinds of services A, B, C and D may be services for transferring different amounts of data or services for transferring data stored in different drives or folders within a server.

Accordingly, the terminal 10 connects devices to the network or determines data to be transferred to the devices by using the RSSI levels of the devices or by using the RSSI levels and location information of the devices, thereby sharing or providing data without a complicated authentication procedure. Hereinafter, a network connecting method of the terminal according to an exemplary embodiment of the present invention will be described with reference to FIG. 7 to FIG. 11.

Figure 7:
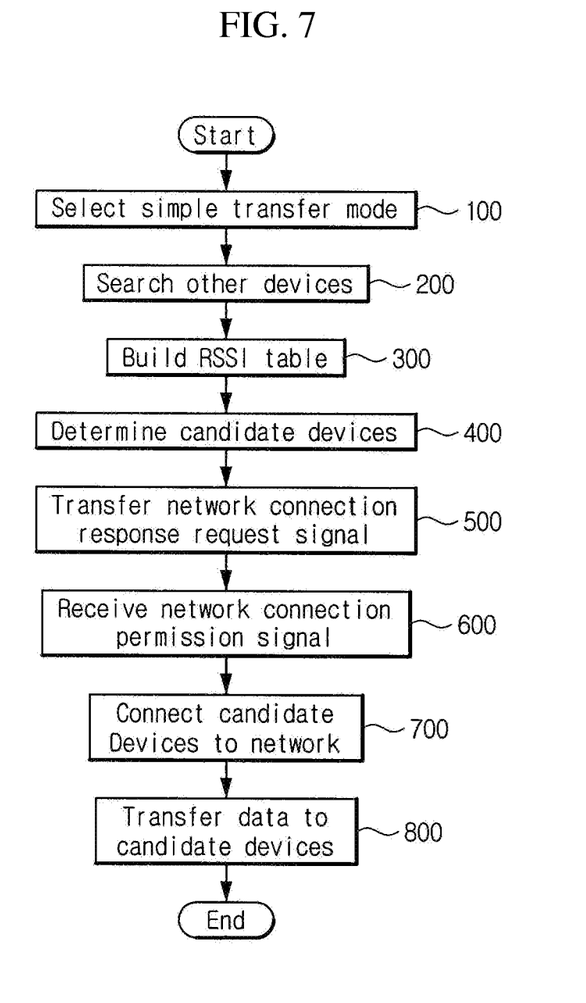
FIG. 7 is a flowchart of a network connection method according to an exemplary embodiment.

FIG. 7 is a flowchart of a network connection method according to an exemplary embodiment.

Referring to FIG. 7, in operation 100, a terminal is selected to act as an AP terminal by choosing an AP mode, and a simple transfer mode is selected. In operation 200, the terminal searches for devices surrounding the terminal by using radio signals received by the antenna unit. If the devices are found, in operation 300, the terminal builds an RSSI table using RSSI level information from the RSSI detecting unit. In operation 400, the terminal determines candidate devices to receive data by using the RSSI table. In an exemplary embodiment, the terminal may determine candidate devices by using the RSSI table and the location information of the devices, detected from a location information detecting unit and/or a GPS location information detecting unit.

In operation 500, the terminal transfers a network connection response request signal to the determined candidate device(s). In operation 700, if a network connection permission signal is received from the candidate device(s), in operation 600, the terminal connects the candidate device(s) to the network. In operation 800, the terminal transfers data to the candidate device(s). The process of transferring the network connection response request signal and receiving the network connection permission signal may be omitted.

Figure 8:
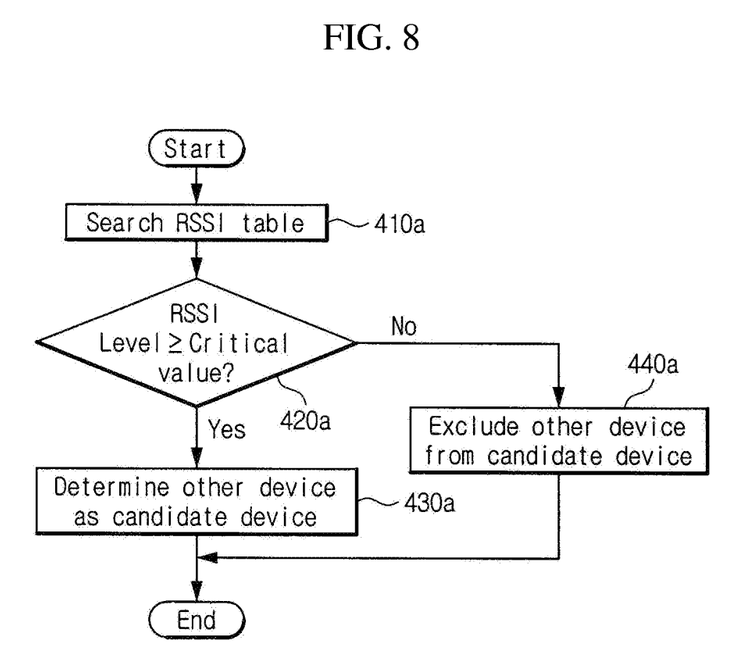
FIG. 8 is a flowchart of a method for determining candidate devices according to an exemplary embodiment.

FIG. 8 is a flowchart of a method for determining candidate devices according to an exemplary embodiment.

Figure 9:
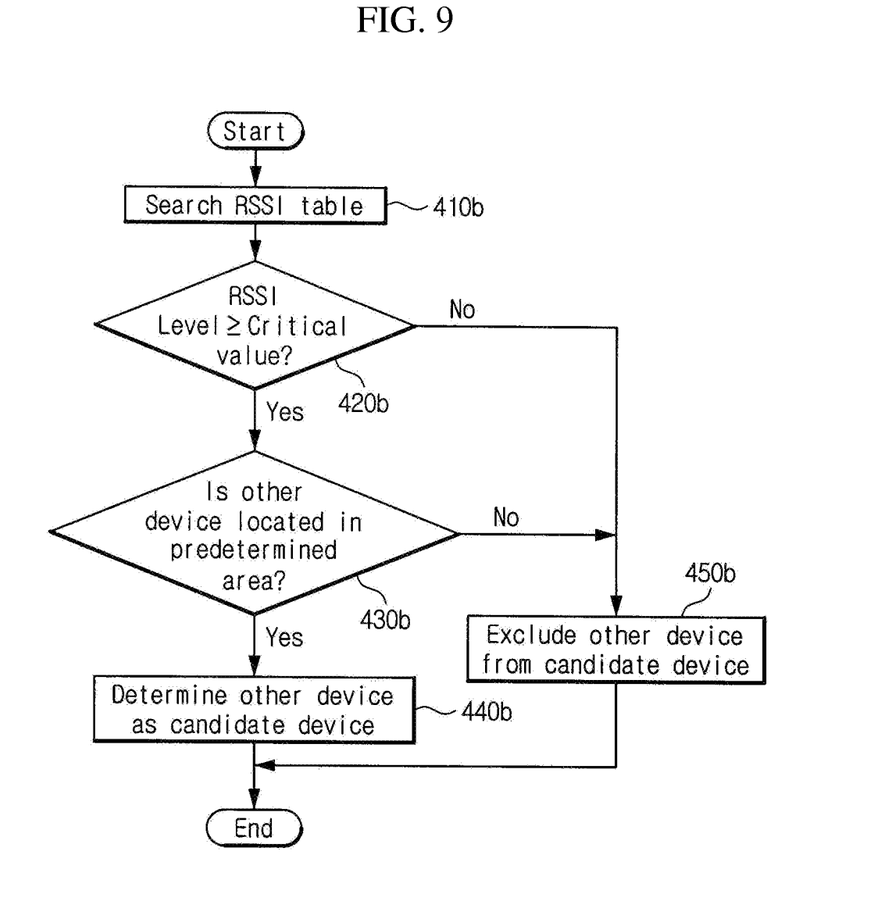
FIG. 9 is a flowchart of a method for determining candidate devices according to an exemplary embodiment.

In operation 410a, the control unit of the terminal searches the RSSI table. In operation 420a, the network device determines whether the RSSI level of each device is more than a critical value. If it is determined that the RSSI level of a device is more than the critical value, in operation 430a, the device is determined as a candidate device. If the RSSI level of a device is less than the critical value, the device is excluded as a potential candidate device in operation 440a FIG. 9 is a flowchart illustrating a method for determining candidate devices according to an exemplary embodiment.

The control unit of the terminal searches devices using a built RSSI table in operation 410b, and determines whether the RSSI level of each of the searched device is more than a critical value in operation 420b. If it is determined that the RSSI level of a device is less than the critical value, the device is excluded from a candidate device in operation 450b.

If it is determined that the RSSI level of a device is more than the critical value, in operation 430b, the control unit of the terminal determines whether the device is located in a specific area. If it is determined that the device is located in the specific area, the device is determined as a candidate device in operation 440b. However, if it is determined that the device is not located in the specific area, the device is excluded as a potential candidate device in operation 450b.

Figure 10:
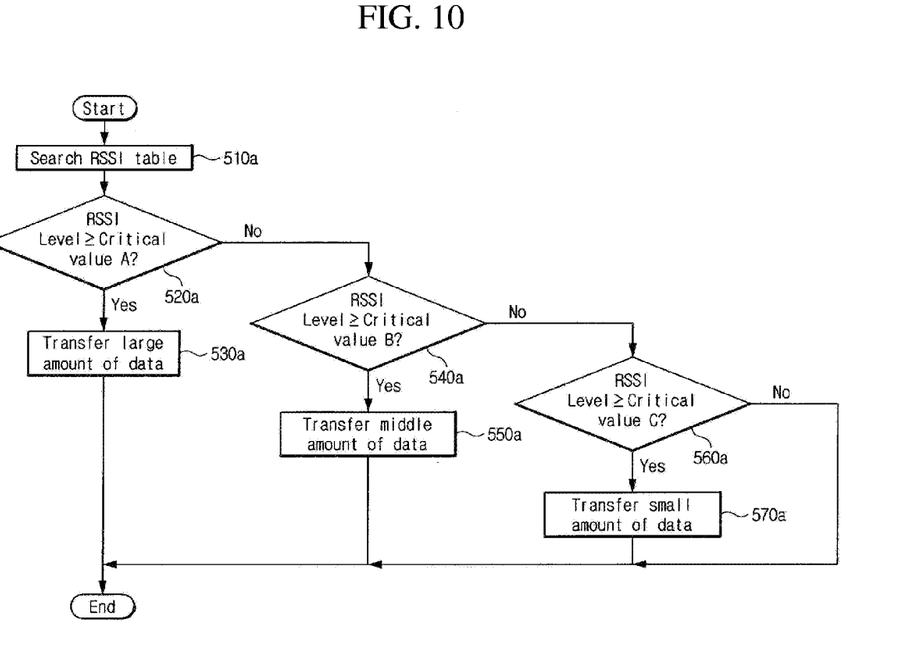
FIG. 10 is a flowchart of a method for transferring data to the candidate devices according to an exemplary embodiment.

FIG. 10 is a flowchart of a method for transferring data to the candidate devices according to an exemplary embodiment.

In operation 510a, the control unit of the terminal searches the RSSI table of the candidate devices. In operation 520a, the control unit determines whether the RSSI level of each of the candidate devices is more than a critical value A. The critical values A, B and C may be critical values for dividing the RSSI range of the candidate devices to receive data. Here, the critical value C is the minimum RSSI level value exceeded by a candidate device to receive data, and the critical values A and B may be values determined by a user so as to divide the range between the RSSI maximum value (MAX) and the critical value C. That is, the relative size of the critical values is: critical value A>the critical value B>the critical value C.

If it is determined that the RSSI level of a candidate device is more than the critical value A in operation 520a, a large amount of data is transferred to the candidate device in operation 530a. In an exemplary embodiment, devices with RSSI level above the critical value A are located closest to the terminal from among the determined candidate devices, and therefore, the candidate device may satisfactorily accept a large amount of data.

If it is determined that the RSSI level of the candidate device is less than the critical value A, the control unit determines whether the RSSI level of the candidate device is more than the critical value B in operation 540a. If it is determined that the RSSI level of the candidate device is more than the critical value B, a middle amount of data is transferred to the candidate device in operation 550a.

If it is determined that the RSSI level of the candidate device is less than the critical value B, the control unit of the terminal determines whether the RSSI level of the candidate device is more than the critical value C in operation 560a. If it is determined that the RSSI level of the candidate device is more than the critical value C, a small amount of data is transferred to the candidate device in operation 570a. If it is determined that the RSSI level of the candidate device is less than the critical value C, no data is transferred to the candidate device.

Figure 11:
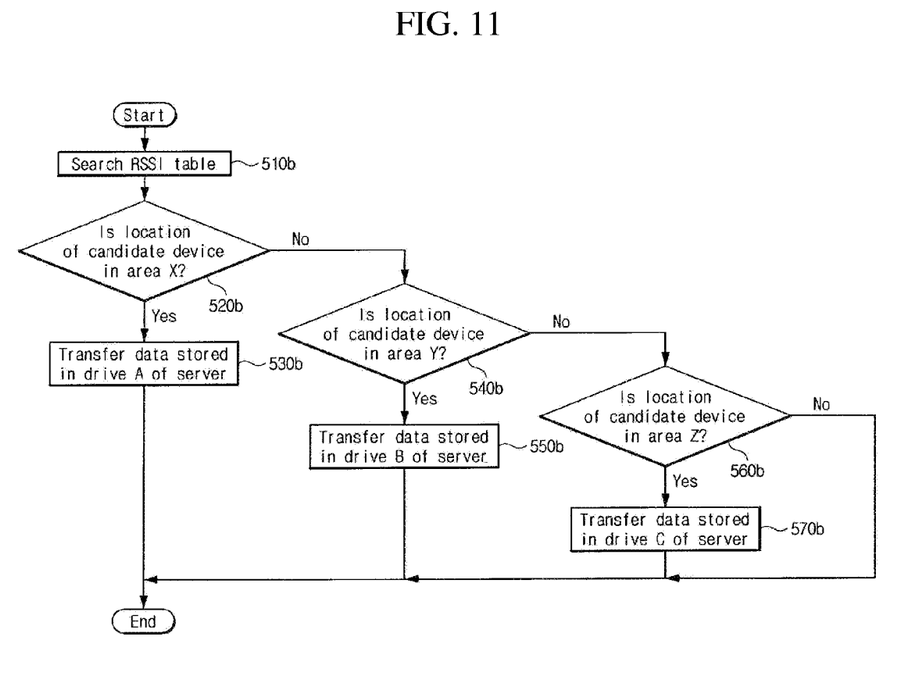
FIG. 11 is a flowchart of a method for transferring data to the candidate devices according to an exemplary embodiment.

FIG. 11 is a flowchart of a method for transferring data to the candidate devices according to an exemplary embodiment.

Referring to FIG. 11, the terminal 10 determines data to be provided to candidate devices by dividing the candidate devices into location areas. A specific area may be previously or contemporaneously stored separately from the RSSI level information and may be further divided into certain areas to provide different data to candidate devices. In FIG. 11, the specific area is divided into areas X, Y and Z.

In operation 510b, the terminal searches the RSSI table for candidate devices. In operation 520b, the terminal determines whether each of or at least one of the candidate devices is located in the area X. If it is determined that the candidate device is located in the area X, in operation 530b, the terminal transfers data stored in drive A of the server to the candidate device.

If it is determined that the candidate device is not located in the area X, in operation 540b, the terminal determines whether the candidate device is located in the area Y. If it is determined that the candidate device is located in the area Y, in operation 550b, the terminal transfers the data stored in drive B of the server to the candidate device.

If it is determined that the candidate device is not located in the area Y, in operation 560b, the terminal determines whether the candidate device is located in the area Z. If it is determined that the candidate device is located in the area Z, in operation 570b, the terminal transfers the data stored in drive C of the server to the candidate device. If it is determined that the candidate device is not located in the area Z, no data is transferred to the candidate device.

Although FIG. 10 is described with respect to transmitting amounts of data, and FIG. 11 is described with respect to transmitting data from specific drives, aspects are not limited thereto such that the data from specific drives may be transmitted according to an RSSI, or other, value, and amounts of data may be transmitted according to location, and combinations thereof.

As described above, in the terminal and network connection method according to exemplary embodiments, the terminal connects devices to a network and transfers data to the devices by using RSSI levels and/or location information without a complicated authentication procedure, thereby enhancing the data accessibility of the devices. It is possible to enhance the efficiency of information provided to the devices in public places such as a public institution, which provide data with commonality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising:
   an antenna unit to transmit signals and to receive signals from devices;
   a received signal strength indication (RSSI) detecting unit to detect RSSI level information from the signals received by the antenna unit, the RSSI level information indicating an RSSI level; and
   a control unit to determine candidate devices from the devices based on the RSSI level detected by the RSSI detecting unit,
   wherein the control unit determines candidate devices based on the device having an RSSI level among the N-highest RSSI levels detected by the RSSI detecting unit and the control unit connects the determined candidate devices to a network.

2. The terminal of claim 1, further comprising:
   a location information detecting unit to detect location information of the devices based on the signals received by the antenna unit,
   wherein the control unit receives the location information, determines if the candidate device is located in a specific area based on the location information, and then connects the candidate device to the network.

3. The terminal of claim 2, wherein the control unit transfers data differently to the candidate device according to the specific area in which the candidate device is located.

4. The terminal of claim 3, wherein the control unit transfers data differently to the candidate device according to the RSSI level of the candidate device.

5. The terminal of claim 4, wherein the control unit transfers the data differently according to amounts or storage locations of the data.

6. The terminal of claim 3, wherein the control unit transfers the data differently according to amounts or storage locations of the data.

7. The terminal of claim 6, wherein the control unit transfers data differently to the candidate device according to the specific area in which the candidate device is located.

8. The terminal of claim 7, wherein the control unit transfers data differently to the candidate device according to the RSSI level of the candidate device.

9. The terminal of claim 8, wherein the control unit transfers the data differently according to amounts or storage locations of the data.

10. The terminal of claim 7, wherein the control unit transfers the data differently according to amounts or storage locations of the data.

11. The terminal of claim 1, further comprising:
    a global positioning system (GPS) sensor module to receive GPS signals; and
    a GPS location information detecting unit to detect location information of the devices based on the GPS signals received by the GPS sensor module,
    wherein the control unit receives the location information, determines if the candidate device is located in a specific area based on the location information, and then connects the candidate device to the network.

12. The terminal of claim 1, wherein the control unit transfers data differently to the candidate devices according to the RSSI levels based on the RSSI level information of the candidate devices.

13. The terminal of claim 12, wherein the control unit transfers the data differently according to amounts or storage locations of the data.

14. The terminal of claim 1, wherein the control unit transfers a network connection response request signal to the candidate device, and connects the candidate device to the network if a network connection permission signal is received from the candidate device.

15. The terminal of claim 1, wherein the network is any one of Bluetooth®, Zigbee®, infrared data association (IrDA®), Wi-Max®, and wireless broadband (Wibro).

16. The terminal of claim 1, wherein the control unit determines a candidate device based on the RSSI level being within a range.

17. The terminal of claim 16, wherein the range is greater than a critical value.

18. A network connection method of a terminal, the method comprising:
    searching for devices;
    detecting a received signal strength indication (RSSI) level information of the searched devices, the RSSI level information indicating an RSSI level;
    determining candidate devices to receive data using the RSSI level; and
    connecting the determined candidate devices to a network,
    wherein the determining of the candidate devices is based on the candidate devices having an RSSI level among the N-highest RSSI levels detected.

19. The method of claim 18, further comprising:
    detecting location information of the devices; and
    determining the devices as candidate devices if the devices are located in a specific area based on the location information of the devices.

20. The method of claim 19, further comprising transferring data differently to the candidate device according to a specific area in which the candidate device is located.

21. The method of claim 20, further comprising transferring data differently to the candidate device according to the RSSI level of the candidate device.

22. The method of claim 21, wherein the transferring data differently comprises transferring different amounts of data or transferring data from different storage locations.

23. The method of claim 20, wherein the transferring data differently comprises transferring different amounts of data or transferring data from different storage locations.

24. The method of claim 18, further comprising transferring data differently to the candidate devices according to the RSSI levels based on the RSSI level information of the candidate devices.

25. The method of claim 24, wherein the transferring data differently comprises transferring different amounts of data or transferring data from different storage locations.

26. The method according to claim 18, further comprising:
   transferring a network connection response request signal to the candidate devices; and
   connecting the candidate devices to the network if a network connection permission signal is received from the candidate devices.

27. The method of claim 26, wherein the network is any one of Bluetooth®, Zigbee®, infrared data association (IrDA®), Wi-Max® and wireless broadband (Wibro).

28. The method of claim 18, wherein the determining of the candidate devices is based on the RSSI level being within a range.

29. The terminal of claim 28, wherein the range is greater than a critical value.

* * * * *